United States Patent [19]
Haviland et al.

[11] Patent Number: 6,089,551
[45] Date of Patent: Jul. 18, 2000

[54] HEIGHT CONTROL VALVE WITH INTEGRAL DUMP DEVICE

[75] Inventors: Robin Lee Haviland, West Chester; David Lee Marlow, Brookville, both of Ohio

[73] Assignee: Crowe Manufacturing Services, Inc., Dayton, Ohio

[21] Appl. No.: 09/021,464

[22] Filed: Feb. 10, 1998

[51] Int. Cl.[7] .................................................. B60G 17/00
[52] U.S. Cl. ................................ 267/64.16; 267/DIG. 1; 280/6.157
[58] Field of Search ........................ 180/41; 280/6.159, 280/6.158, 6.157; 267/64.16, 64.28, DIG. 1, 64.19, 123

[56] References Cited

U.S. PATENT DOCUMENTS

| | | | |
|---|---|---|---|
| 2,888,272 | 5/1959 | Fletcher | 280/124 |
| 2,908,508 | 10/1959 | Brunsdon et al. | 280/124 |
| 2,910,305 | 10/1959 | Marette et al. | 280/124 |
| 2,919,930 | 1/1960 | Cislo | 280/124 |
| 2,929,619 | 3/1960 | Christensen | 267/65 |
| 2,938,736 | 5/1960 | Brown | 280/124 |
| 2,964,311 | 12/1960 | Stelzer | 267/65 |
| 2,965,391 | 12/1960 | Whelan | 280/124 |
| 2,969,975 | 1/1961 | Chuba | 267/65 |
| 2,976,053 | 3/1961 | Pribonic et al. | 280/124 |
| 2,986,404 | 5/1961 | Chuba et al. | 280/6.157 |
| 3,036,596 | 5/1962 | Alfieri | 137/596.2 |
| 3,037,788 | 6/1962 | Haddad | 280/6.159 |
| 3,442,502 | 5/1969 | Fischer et al. | 267/64.16 |
| 3,559,688 | 2/1971 | Fischer et al. | 267/64.16 |
| 3,563,270 | 2/1971 | Denny | 280/6.158 |
| 3,584,894 | 6/1971 | Jackson | 280/124 |
| 3,635,460 | 1/1972 | Shilton et al. | 267/65 D |
| 3,858,903 | 1/1975 | Henry et al. | 280/124 |
| 3,889,935 | 6/1975 | Palm et al. | 267/65 D |
| 3,933,368 | 1/1976 | Kellet | 280/124 |
| 4,058,345 | 11/1977 | Klimek | 303/6 M |
| 4,077,617 | 3/1978 | Wright | 267/65 D |
| 4,170,279 | 10/1979 | Pelletier | 188/300 |
| 4,231,554 | 11/1980 | Ekonen et al. | 267/65 D |
| 4,238,128 | 12/1980 | McKee | 280/703 |
| 4,309,022 | 1/1982 | Reinicke et al. | 251/61.4 |
| 4,383,717 | 5/1983 | Bueler | 303/7 |

(List continued on next page.)

FOREIGN PATENT DOCUMENTS 700429  12/1964  Canada ............................. 267/64.16

*Primary Examiner*—Paul N. Dickson
*Assistant Examiner*—Mariano Sy
*Attorney, Agent, or Firm*—Biebel & French

[57] ABSTRACT

A height control valve including a leveling valve integral with a dump valve for controlling air flow to and from an air spring supporting a vehicle frame above an axle is disclosed. The height control valve includes a valve body defining first and second internal chambers. The leveling valve is defined by a leveling seal assembly received within the first internal chamber. The leveling seal assembly controls fluid flow into the first internal chamber through an intake port and fluid flow out of the first internal chamber through an exhaust port. The leveling seal assembly includes a rocker arm alternatively engagable with intake and exhaust pins which are adapted for sealingly engaging the intake and exhaust ports, respectively. Pivoting movement of the rocker arm results in one of the intake and exhaust pins being forced away from the respective intake or exhaust port resulting in fluid flow therethrough. The dump valve includes a dump seal assembly received within the second internal chamber and selectively moveable between a normal operating position and a dump position by an actuator. During the normal operating position the air spring is in communication with the first internal chamber and during the dump position the air spring is in fluid communication with a dump port which exhausts directly to atmosphere. The dump seal assembly may be activated to dump the air from the air spring by the application of either an increased fluid pressure or a decreased fluid pressure to a pilot port.

24 Claims, 12 Drawing Sheets

U.S. PATENT DOCUMENTS

| | | | |
|---|---|---|---|
| 4,455,051 | 6/1984 | Falk | 303/6 C |
| 4,455,052 | 6/1984 | Bueler | 303/6 C |
| 4,462,610 | 7/1984 | Saito et al. | 280/707 |
| 4,673,172 | 6/1987 | Blanz | 267/64.11 |
| 4,726,571 | 2/1988 | Smith et al. | 267/64.16 |
| 4,886,092 | 12/1989 | Barzelay | 137/627.5 |
| 4,974,861 | 12/1990 | Itoh et al. | 280/6.1 |
| 5,161,579 | 11/1992 | Anderson, Jr. | 137/627.5 |
| 5,161,817 | 11/1992 | Daum et al. | 280/714 |
| 5,203,375 | 4/1993 | Blanz | 137/627.5 |
| 5,288,102 | 2/1994 | Machida et al. | 280/708 |
| 5,322,353 | 6/1994 | Wallestad | 303/7 |
| 5,333,645 | 8/1994 | Galazin | 137/627.5 |
| 5,335,695 | 8/1994 | Pierce | 137/627.5 |
| 5,560,591 | 10/1996 | Trudeau et al. | 267/64.16 |

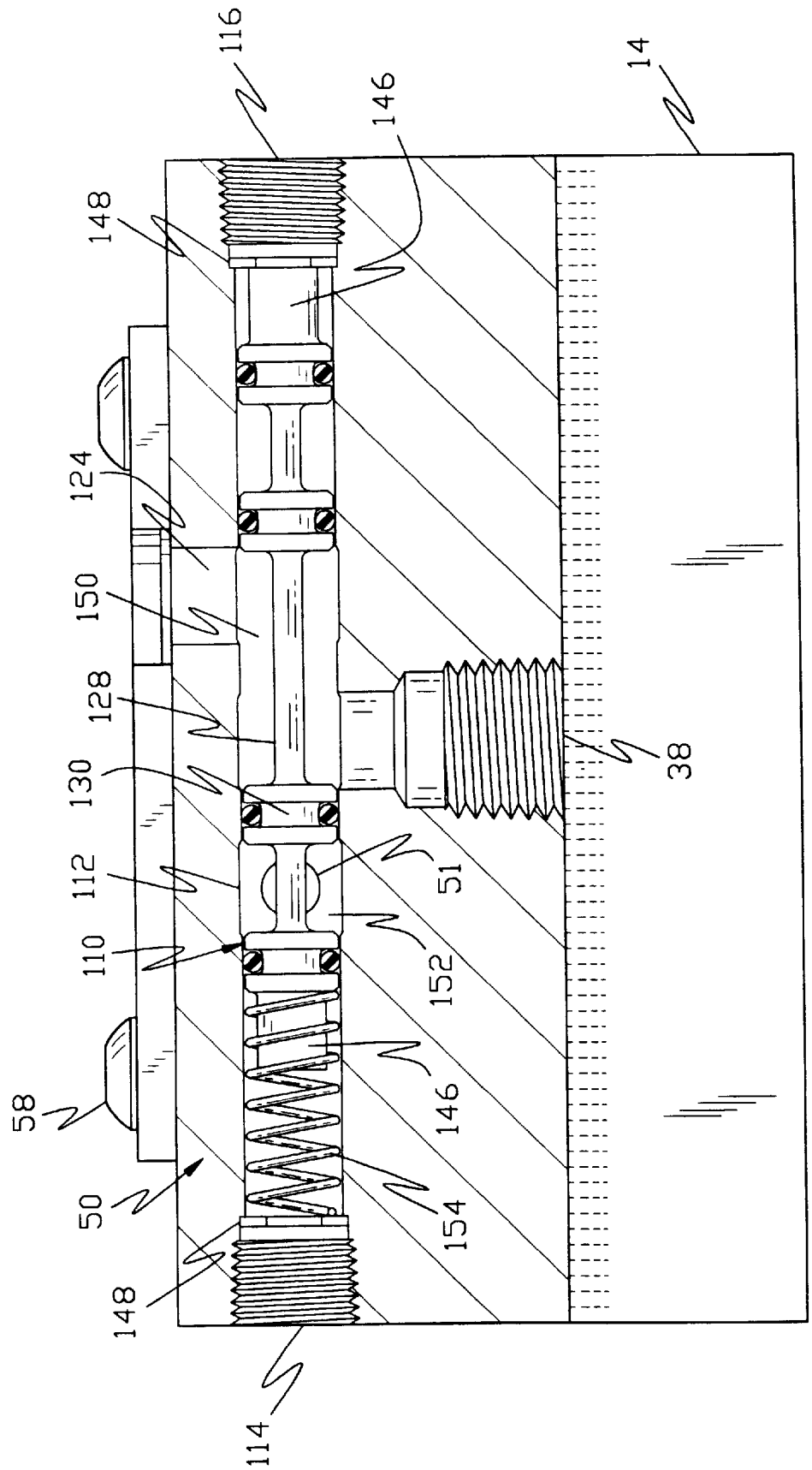

HEIGHT CONTROL VALVE WITH INTEGRAL DUMP DEVICE

BACKGROUND OF THE INVENTION

1. Field of the Invention

The present invention relates to fluid suspension systems for vehicles and, more particularly, to height control valves for use in such fluid suspension systems.

2. Description of the Prior Art

Air suspension systems are commonly used in vehicles for maintaining the frame above the axles by a predetermined spacing. Air springs are often employed in such suspension systems to support the frame wherein supplying air to the air spring raises the vehicle frame, while exhausting air from the air spring lowers the vehicle frame. Most air suspension systems incorporate height control valves for maintaining a desired spacing or height of the frame relative to an axle of the vehicle. The height control valve senses when the spacing between the frame and axle is greater or less than the desired value and, accordingly, adjusts the air flow to and from the air spring.

Height control valves are typically mounted on the vehicle frame and include a position arm which is operably connected to the axle through a linkage. As the distance between the vehicle frame and the axle varies, the linkage causes the position arm to rotate a shaft inside the height control valve which selectively permits air to be supplied to or exhausted from the air spring.

A conventional height control valve has three ports: an air spring port connected to the air spring, an inlet port connected to a source of pressurized air, and an exhaust port open to the atmosphere. To increase the spacing between the vehicle frame and the axle, the height control valve permits fluid communication between the air spring port and the inlet port thereby allowing air to flow from the pressurized air source to the air spring. To decrease the spacing of the vehicle frame relative to the axle, the height control valve permits fluid communication between the air spring port and the exhaust port, thereby allowing air to flow out of the air spring to atmosphere. When the vehicle is at the desired height relative to the axle, the valve is in a neutral position in which neither the inlet port nor exhaust port communicates with the air spring.

While the prior art height control valves have been effective in maintaining a substantially constant average height of the vehicle frame relative to an axle, they have failed to provide effective means for preventing operation of the valve in response to sudden and momentary variations in spacing between the frame and axle as may result from the vehicle passing over surface irregularities. Attempts by some prior art valves to correct for such minor irregularities or disturbances results in continuous valve operation in order to find the desired height of the frame, thereby increasing air consumption and draining the source of pressurized air. While some prior art valves provide for a time delay during initial periods of spacing variations between the frame and axle so as to prevent admission of air to or discharge of air from the air spring in response to relatively minor differential spacings between the frame and axle, these valves fail to provide efficient and accurate control of relative frame height during vehicle loading and unloading. More particularly, the time delay of such prior art valves prevent the rapid and accurate admission of air to or discharge of air from the air spring in response to differential spacing between the frame and axle resulting from vehicle loading or unloading.

Accordingly, there is a need for a height control valve which effectively restricts fluid flow to and from an air spring in response to slight variations in height or spacing between a vehicle frame and axle while also providing rapid response to and accurate control of spacing variations resulting from vehicle loading and unloading.

During operation, it is often desirable to rapidly exhaust the air from within the air springs to atmosphere thereby quickly lowering the vehicle frame relative to the axle. For example, on trucks comprising tractors pulling trailers, the air is often "dumped" or completely exhausted from the tractor air springs, thereby lowering the tractor frame relative to the trailer. Prior to exhausting the air, the operator typically lowers the front dolly legs on the trailer until they touch the ground. After dumping the air from the air springs and lowering the tractor, the full weight of the trailer is supported by the dolly legs and the tractor is free to separate from the trailer.

Likewise, it is also often desirable to quickly "dump" or completely exhaust the air from the air springs of a trailer to quickly lower the trailer frame relative to the axles. For example, during loading of the trailer it is preferable to have the trailer frame in a fixed position relative a loading platform or dock. By dumping the air from the air springs, the frame is lowered until it is supported on a hard stop to thereby prevent floating or creeping of the trailer away from the loading platform or dock.

Dump valves have been utilized in the prior art to quickly exhaust the air contained within air springs to atmosphere. However, such dump valves are typically independent devices which must be separately mounted to the vehicle frame and plumbed between the air spring and the height control valve. While attempts have been made at incorporating dump valves within height control valves, the resulting valves have comprised complicated sealing arrangements defining complex air flow paths through the height control valve such that it takes a relatively long time to completely exhaust air from the air spring.

Furthermore, the prior art dump valves typically provide for activation only by the application of increased air pressure to a positive pilot port. Since conventional tractors have independent air compressors, increased pilot pressure may be utilized to activate the dump valve and exhaust the air spring supporting a tractor frame. However, conventional trailers do not include separate sources of pressurized air and therefore an independent source of pressurized fluid must be provided to activate the dump valve and exhaust the air spring supporting a trailer frame.

Accordingly there is a need for a height control valve having a simple and efficient integral dump valve. Further, there is a need for such a dump valve which may be activated by a decrease in fluid pressure applied to a negative pilot port.

SUMMARY OF THE INVENTION

The present invention provides a height control valve including a leveling valve for controlling fluid flow to and from a fluid spring and thereby maintaining a constant spacing between a vehicle frame and an axle. The height control valve further includes an integral dump valve having a dump seal assembly activated by fluid supplied to a pilot port for providing rapid exhausting or dumping of the fluid from within the fluid spring.

In accordance with the present invention, a height control valve for controlling a fluid spring is disclosed which includes a valve body defining first and second internal chambers. An intake port is adapted to provide fluid communication between an external fluid source and the first internal chamber, while an exhaust port is adapted to provide fluid communication between the atmosphere and the first internal chamber. A supply channel provides fluid communication between the first and second internal chambers. A dump port is adapted to provide fluid communication between the atmosphere and the second internal chamber, and a fluid spring port is adapted to provide fluid communication between the fluid spring and the second internal chamber. An operating member, or position arm, is pivotally supported on the valve body and is movable relative to the valve body to provide an input.

A leveling valve is defined by a leveling seal assembly received within the first internal chamber. The leveling seal assembly controls fluid flow through the first internal chamber in response to the input from the operating member. The leveling seal assembly includes a rocker arm pivotally mounted for movement between a neutral position, an intake position and an exhaust position. The neutral position is defined when the leveling seal assembly prevents fluid flow between the supply channel and both intake and exhaust ports. The intake position is defined when the leveling seal assembly places the supply channel in fluid communication with the intake port in response to an input from the operating member greater than a first predetermined value. Likewise, the exhaust position is defined when the leveling seal places the supply channel in fluid communication with the exhaust port in response to the operating member providing an input less than a second predetermined value.

The leveling seal assembly further includes intake and exhaust pins alternatively engagable with the intake and exhaust ports, respectively. During the neutral position of the rocker arm, the rocker arm is disengaged from both intake and exhaust pins which, in turn, are in sealing engagement with the intake and exhaust ports, respectively. During the intake position, the rocker arm engages the intake pin thereby forcing the intake pin away from the intake port. The exhaust pin, however, is disengaged from the rocker arm and remains in sealing engagement with the exhaust port during the intake position. During the exhaust position, the rocker arm engages the exhaust pin thereby forcing the exhaust pin away from the exhaust port. In this position, the intake pin is disengaged from the rocker arm and remains in sealing engagement with the intake port.

The intake and exhaust pins each include a bearing surface facing one of a pair of engagement surfaces on the rocker arm. As the rocker arm pivots in response to the input from the operating member, the engagement surfaces of the rocker arm are alternatively engagable with the bearing surfaces of the intake and exhaust pins.

A gap of predetermined thickness is provided between the bearing surfaces of the intake and exhaust pins and the respective engagement surfaces of the rocker arm when the rocker arm is in the neutral position. The gap provides a dead band for minimizing fluctuations in the sealing engagement of the intake and exhaust pins with the intake and exhaust ports, respectively, upon pivotal movement of the rocker arm in response to the operating member providing an input between the first and second predetermined valves.

The intake and exhaust ports each define a tapered aperture opening towards the first internal chamber, and the intake and exhaust pins each include tapered seals for cooperating in sealing engagement with the tapered apertures of the intake and exhaust ports. The cooperating tapered apertures and seals provide for regulated variable fluid flow through the intake and exhaust ports.

The dump valve includes a dump seal assembly received within the second internal chamber. The dump seal assembly is selectively moveable by an actuator between a normal operating position and a dump position for controlling fluid flow through the second internal chamber. The normal operating position is defined when the fluid spring port is in communication with the supply channel and therefor the first internal chamber. The dump position is defined when the fluid spring port is in direct communication with the dump port.

The dump seal assembly includes a spool slidably received within the second internal chamber and supporting first and second sealing discs sealingly engaging the second internal chamber. A first fluid passage is defined between the first and second sealing discs for providing fluid communication between the fluid spring port and the supply channel when the spool is in the normal operating position. The first fluid passage provides direct fluid communication between the fluid spring port and the dump port when the spool is in the dump position.

The dump valve further comprises a pilot port adapted to provide fluid communication between an external fluid source and the second internal chamber. The actuator comprises a pilot sealing disc supported on the spool and sealingly engaging the second internal chamber whereby the selective administration of fluid pressure to the pilot port causes movement of the spool between the normal operating position and the dump position.

The dump valve further comprises a biasing means for biasing the spool towards the pilot port. In a first embodiment of the invention, the biasing means forces the spool towards the normal operating position such that positive fluid pressure applied to the pilot port opposes the biasing means and causes the spool to move within the second internal chamber in a direction towards the dump position. In a second embodiment of the invention, the biasing means forces the spool towards the dump position such that positive fluid pressure applied to the pilot port opposes the biasing means and causes the spool to move within the second internal chamber in a direction towards the normal operating position.

Therefore, it is an object of the present invention to provide a simple, efficient and effective height control valve for controlling fluid flow to and from a fluid spring and thereby maintaining a constant average spacing between a vehicle frame and an axle.

It is a further object of the present invention to provide a height control valve which provides an efficient and direct flow path communicating with a fluid spring for facilitating the rapid supply and exhaust of fluid to and from the fluid spring.

It is still another object of the present invention to provide a height control valve which regulates the flow rate of fluid supplied to and exhausted from a fluid spring.

It is an additional object of the present invention to provide a height control valve which reduces fluid consumption.

It is a further object of the present invention to provide a height control valve which restricts fluid flow to and from a fluid spring in response to slight variations in spacing between a vehicle frame and an axle.

It is yet another object of the invention to provide a height control valve including an integral dump valve for quickly exhausting fluid from a fluid spring.

It is an additional object of the present invention to provide such a dump valve including a negative pilot port responsive to a decrease in pilot fluid pressure for activating the dump valve and thereby quickly exhausting fluid from within the fluid spring.

Other objects and advantages of the invention will be apparent from the following description, the accompanying drawings and the appended claims.

BRIEF DESCRIPTION OF THE DRAWINGS

FIG. 15 is a cross sectional view of the dump seal assembly of FIG. 14, illustrating the dump seal assembly in a dump position.

DESCRIPTION OF THE PREFERRED EMBODIMENT

Figure 1:
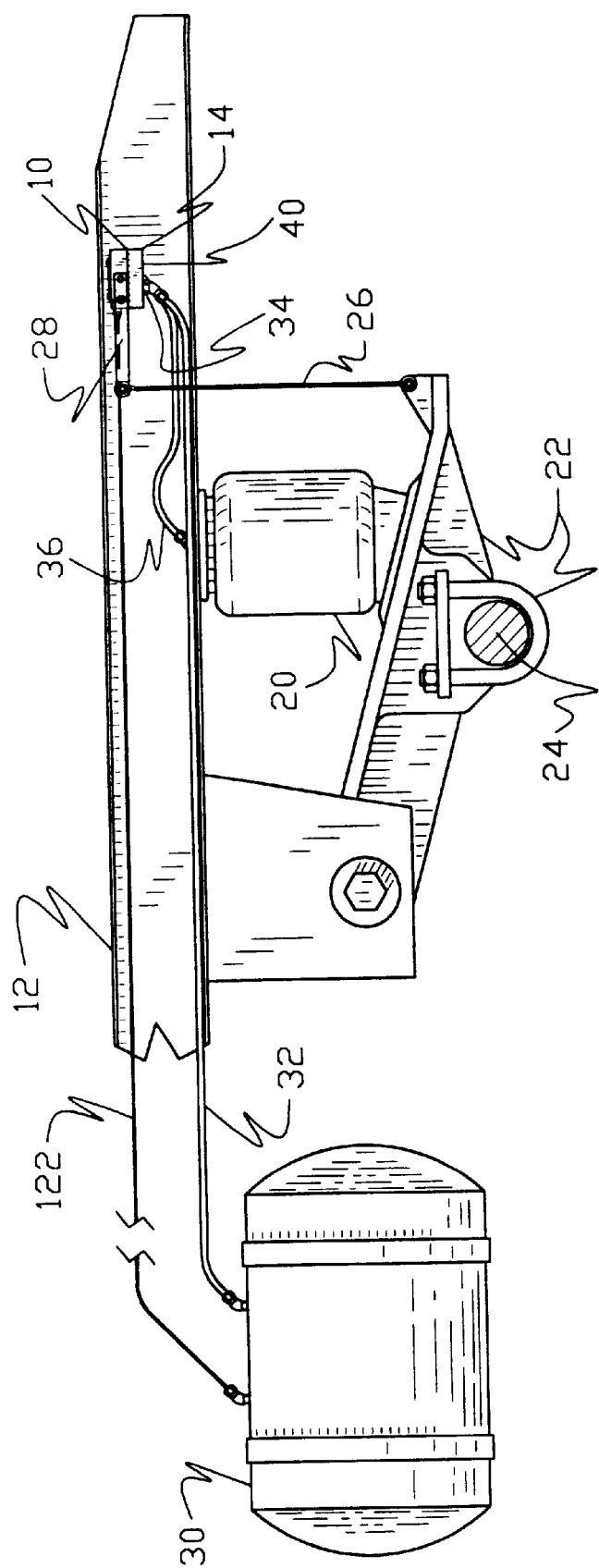
FIG. 1 is a partial schematic side view illustrating the height control valve of the present invention utilized in combination with an air spring for a vehicle.

Referring initially to FIGS. 1–5, the height control valve 10 of the present invention is shown for mounting to a vehicle frame 12. The height control valve 10 includes a valve body 14 having a pair of threaded studs 16 for securing the valve body 14 to the vehicle frame 12. The height control valve 10 is adapted to supply air to an air spring 20 mounted between the frame 12 and an axle support 22 which rotatably supports an axle 24. A linkage 26 operably connects an operating member, preferably a position arm 28, with the axle support 22 such that when a load is placed on or removed from the vehicle, the position arm 28 will move upwardly or downwardly, respectively, relative to the height control valve 10 mounted on the vehicle frame 12.

Figure 2:
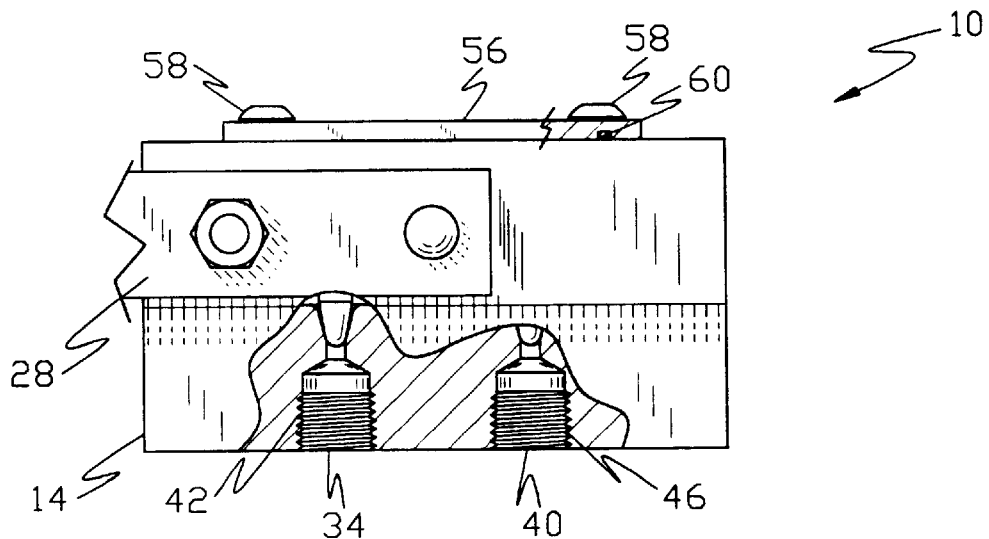
FIG. 2 is a first side elevational view with a partial cut-away of the height control valve of the present invention.
Figure 3:
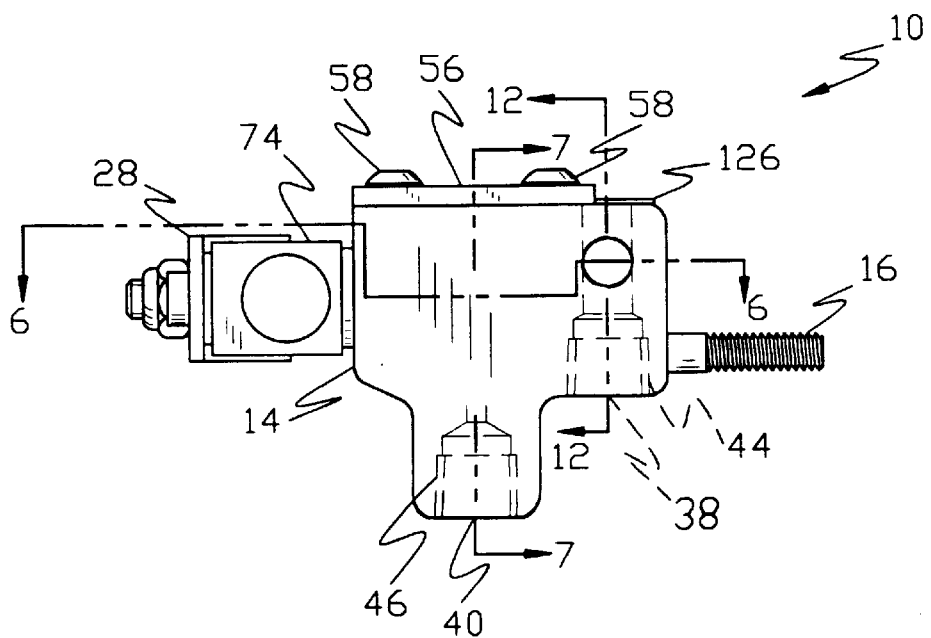
FIG. 3 is an end view of the height control valve of FIG. 2.
Figure 4:
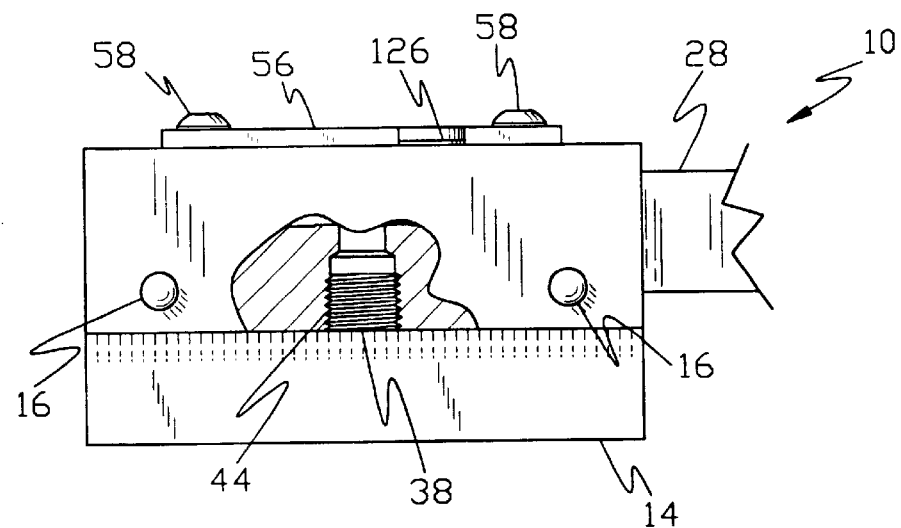
FIG. 4 is a second side elevational view with a partial cut-away of the height control valve of FIG. 2.

Air is supplied from a fluid source, such as a compressed air tank 30, by a fluid supply line 32 in fluid communication with an intake port 34. The air is delivered to the air spring 20 through a delivery line 36 which is in fluid communication with a fluid spring port 38. Air may be exhausted from the height control valve 10 to the atmosphere through an exhaust port 40. Internal threads 42 on the intake port 34 and internal threads 44 on the fluid spring port 38 facilitate the interconnection of the fluid supply line 32 and delivery line 36, respectively (FIGS. 2 and 4). Threads 46 may also be provided on the exhaust port 40 for attaching a muffling device (not shown).

Figure 6:
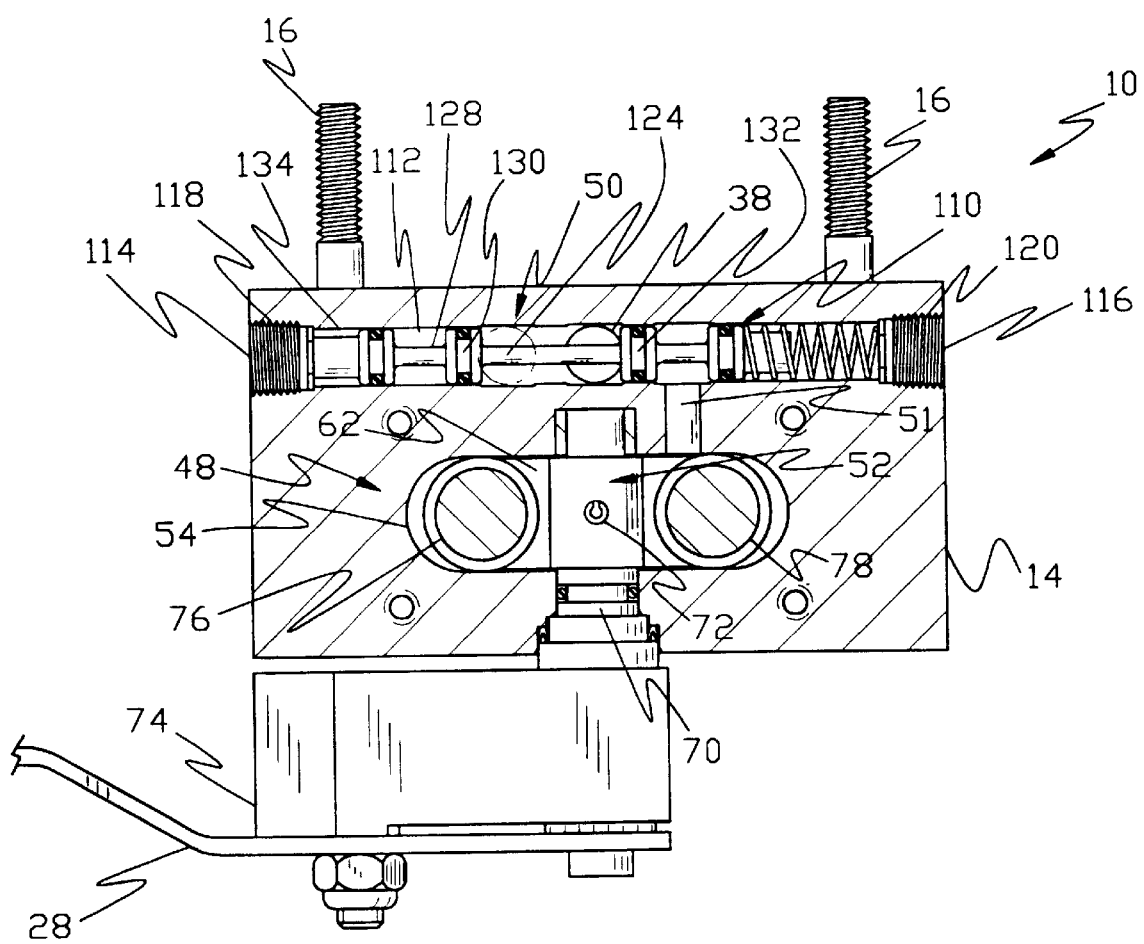
FIG. 6 is a cross sectional view of the height control valve taken along line 6—6 of FIG. 3, illustrating the dump seal assembly in a dump position.
Figure 7:
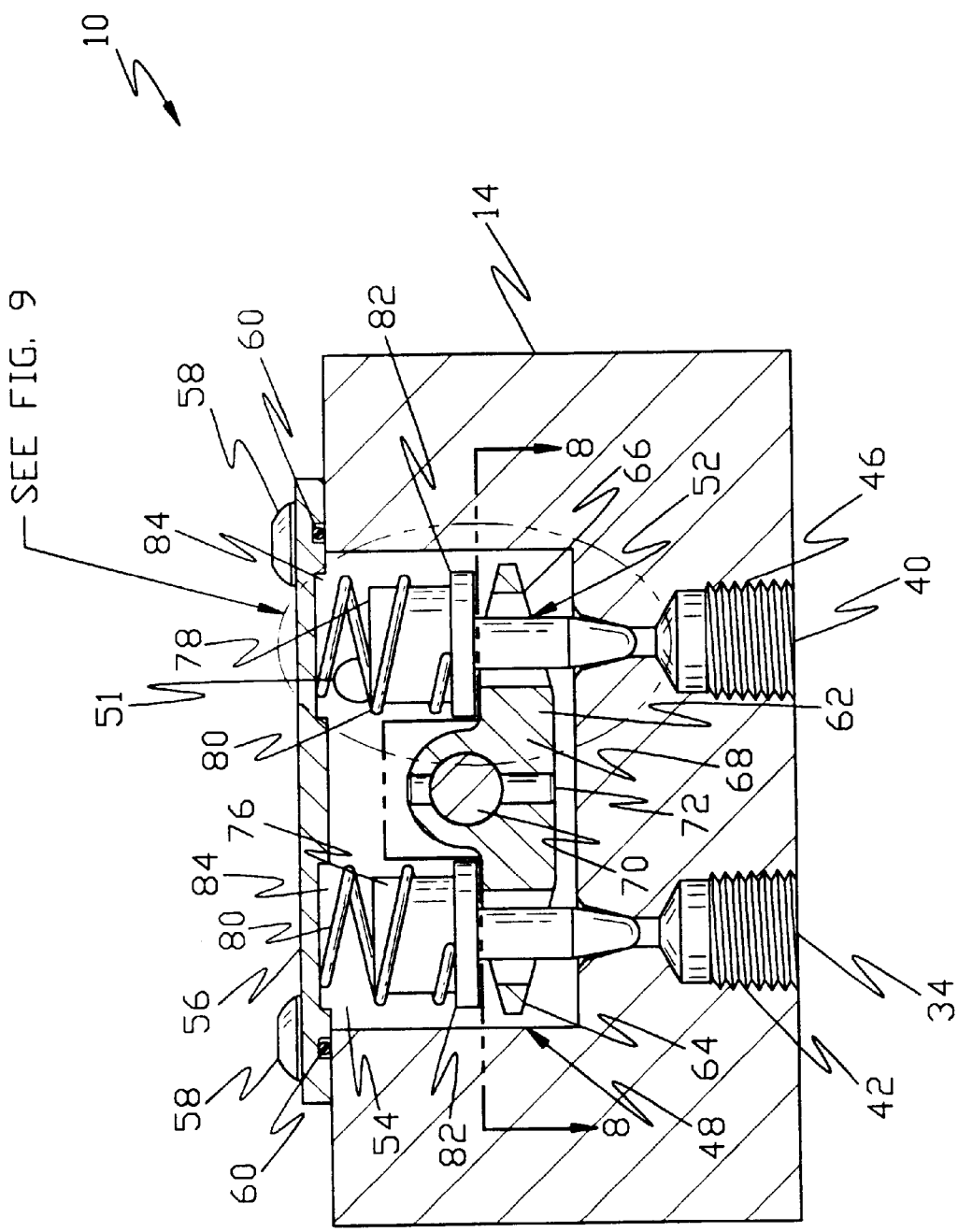
FIG. 7 is a cross sectional view of the height control valve taken along line 7—7 of FIG. 3, illustrating the leveling seal assembly in a neutral position.

Referring now to FIGS. 6–9, the height control valve 10 includes a leveling valve 48 integral with a dump valve 50 wherein fluid communication between the leveling valve 48 and dump valve 50 is provided by a supply channel 51. More particularly, the leveling valve 48 is defined by a leveling seal assembly 52 received within a first internal chamber 54. The first internal chamber 54 is formed within the valve body 14 and sealed by a cover plate 56. The cover plate 56 is secured to the valve body 14 by a series of bolts 58 wherein a resilient member, preferably an O-ring 60, is compressed between the cover plate 56 and valve body 14 to facilitate sealing engagement therebetween (FIG. 7).

The leveling seal assembly 52 includes a rocker arm 62 supported for pivotal movement within the first internal chamber 54. The rocker arm 62 includes first and second opposing wings 64 and 66 spaced apart by a centrally positioned mounting body 68. A rotatably mounted shaft 70 supports the rocker arm 62 for pivotal movement wherein the mounting body 68 is secured to the rotatable shaft 70 by a spring pin 72. As is readily apparent, the first and second wings 64 and 66 are alternatively pivotable in upward and downward directions as the shaft 70 rotates in clockwise and counter-clockwise directions.

Figure 10:
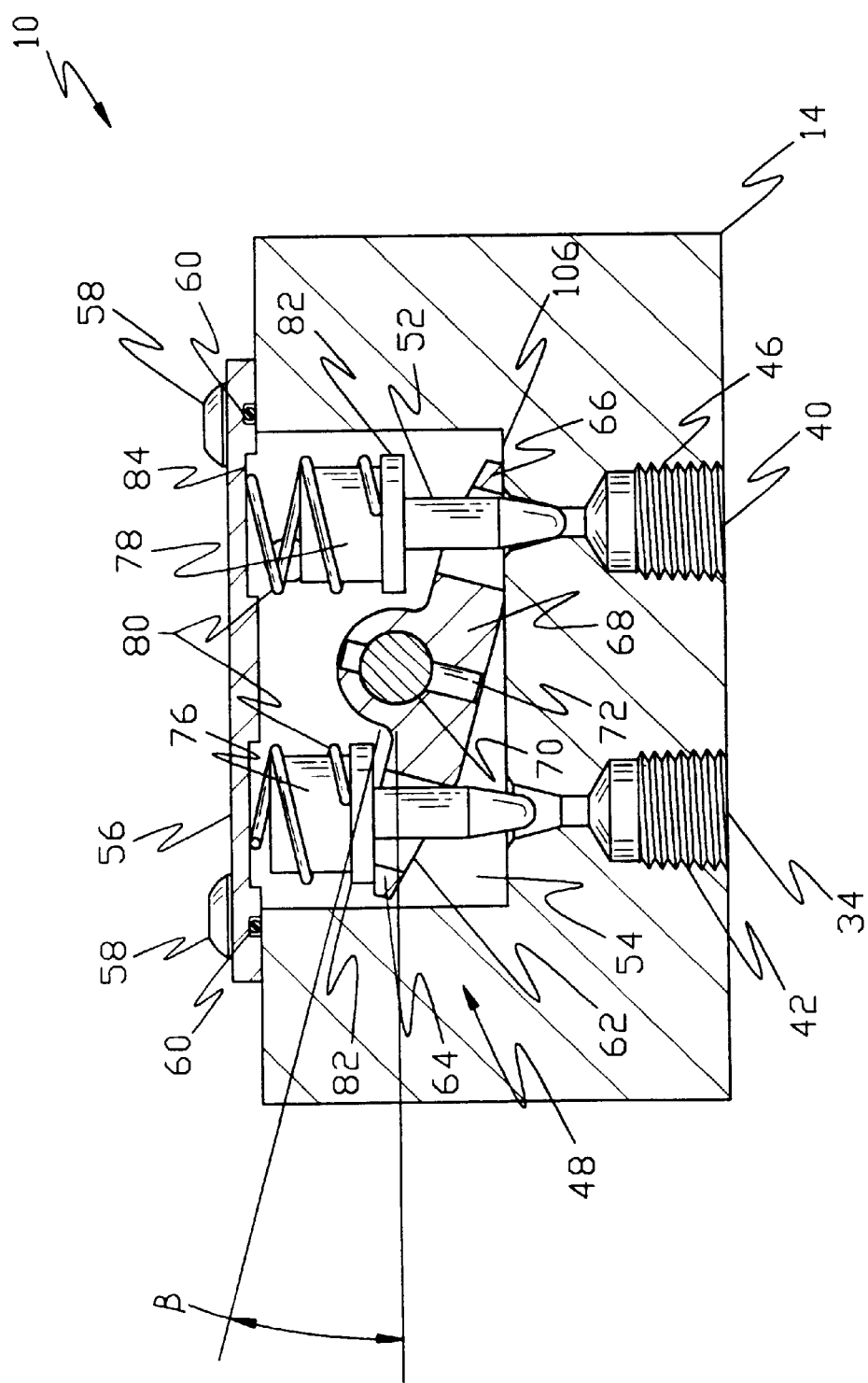
FIG. 10 is a cross sectional view of the height control valve taken along line 7—7 of FIG. 3, illustrating the leveling seal assembly in a full intake position.
Figure 11:
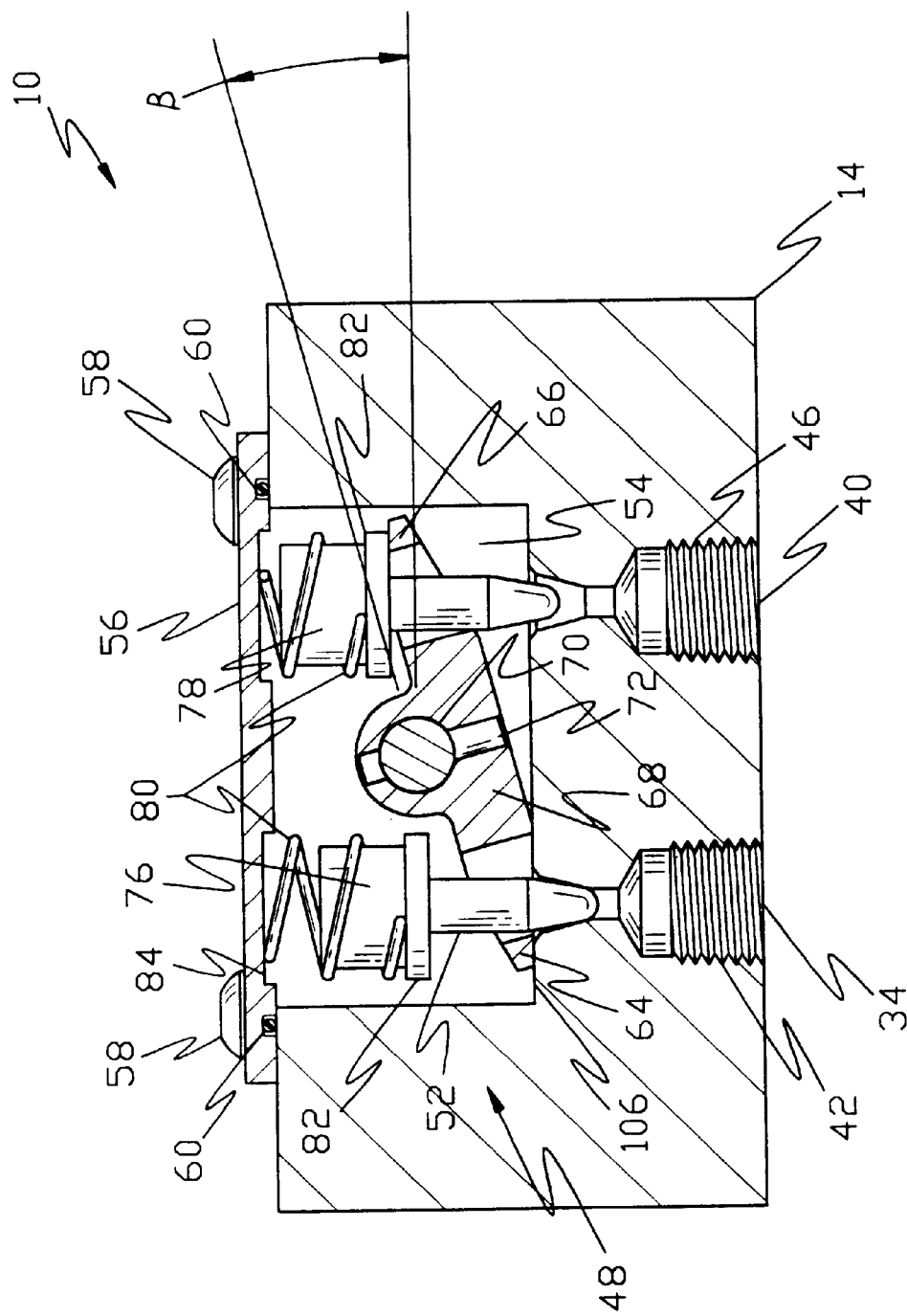
FIG. 11 is a cross sectional view of the height control valve taken along line 7—7 of FIG. 3, illustrating the leveling seal assembly in a full exhaust position.

Shaft 70 is operably connected to the position arm 28 by means of an over-travel body 74 such that movement of the position arm 28 provides an input for the rocker arm 62. More particularly, movement of the vehicle frame 12 downwardly towards the axle support 22 results in upward movement of the position arm 28. As seen in FIGS. 6, 7 and 10, the position arm 28 thereby provides an input in the form of a clockwise rotation to the shaft 70 and rocker arm 62. Movement of the vehicle frame 12 upwardly away from the axle support 22 results in downward movement of the position arm 28. With further reference to FIG. 11, the position arm 28 thereby provides an input in the form of a counter-clockwise rotation to the shaft 70 and rocker arm 62. For illustrative purposes only, it will be assumed that clockwise rotation of the shaft 70 is a positive value while counter-clockwise rotation of the shaft 70 is a negative value.

The over-travel body 74 is of the type well known in the art and allows for the position arm 28 to rotate 360° and thereby extend alternatively to the left or right of valve body 14. While it is assumed for illustrative purposes that the position arm 28 extends to the left of valve body 14, it will be apparent that the height control valve 10 of the present invention will function equally well with the position arm 28 extending to the right of the valve body 14. If the position arm 28 extends to the right of the valve body 14, then the intake and exhaust ports 34 and 40 are interchanged. Threads 46 on the exhaust port 40 facilitate the connection of the fluid supply line 32 therewith (FIGS. 1 and 2). The over-travel body 74 is spring biased to prevent damage to the internal structure of the height control valve 10 should the position arm 28 "over-travel" or extend beyond its normal operating limits.

The leveling seal assembly 52 further comprises intake and exhaust pins 76 and 78 cooperating with the intake and exhaust ports 34 and 40, respectively. The intake and exhaust pins 76 and 78 are each biased towards the intake and exhaust ports 34 and 40, respectively, by a spring 80. Each spring 80 is received between an upper surface of a annular flange 82 formed within each pin 76 and 78 and one of a pair of recesses 84 formed within the cover plate 56. The recesses 84 within the cover plate 56 locate and prevent undesirable shifting of the springs 80, and therefore the pins 76 and 78, within the first internal chamber 54.

Figure 8:
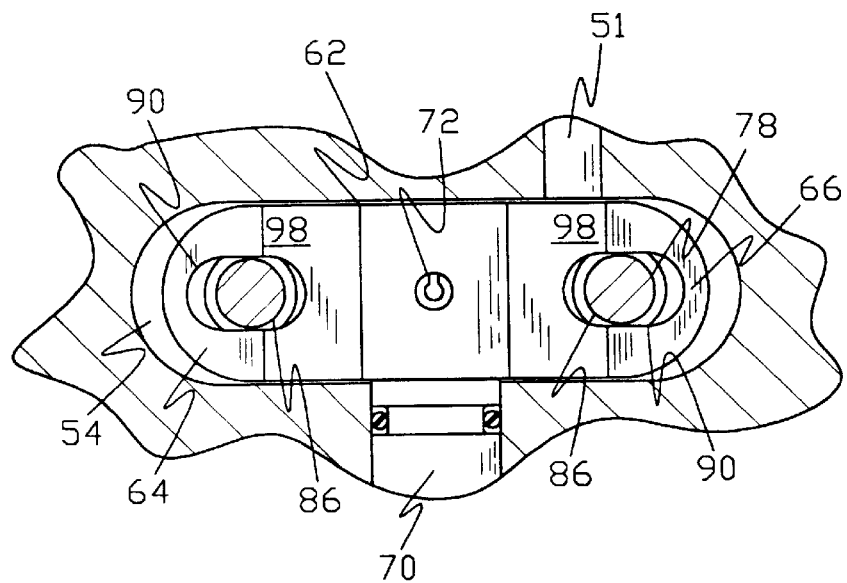
FIG. 8 is a top plan view of the rocker arm taken along line 8—8 of FIG. 7.
Figure 9:
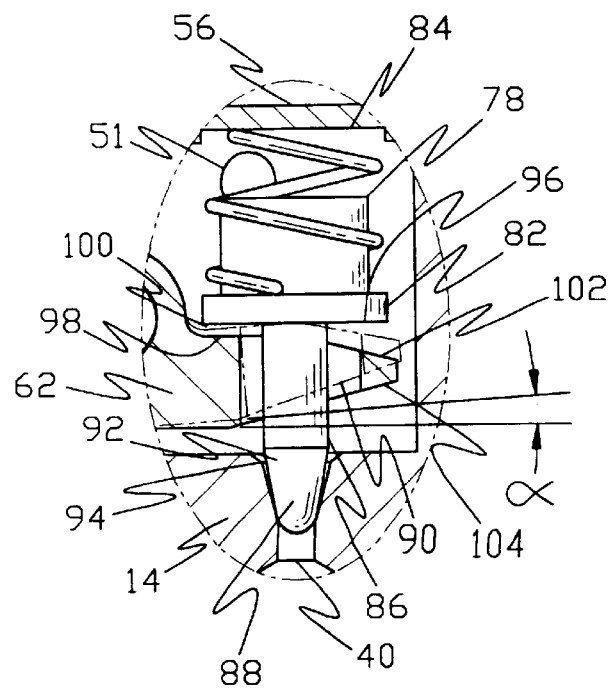
FIG. 9 is an enlarged detail of a portion of FIG. 7, illustrating the dampening gap of the present invention.

As seen in FIGS. 7–9, an elongated member 86 is integrally formed with each pin 76 and 78 and extends from the flange 82 towards an end 88 adapted for sealing engagement with one of the intake and exhaust ports 34 and 40. The elongated members 86 each pass through a slot 90 formed within each wing 64 and 66 of the rocker arm 62 (FIG. 8). The end 88 of each elongated member 82 includes a tapered seal 92, preferably comprising a resilient rubber, for facilitating sealing engagement with one of the ports 34 and 40.

Each tapered seal 92 cooperates with a respective tapered aperture 94 of one of the intake and exhaust ports 34 and 40 opening towards the first internal chamber 54. The degree of taper of the seals 92 is less than that of the apertures 94 such that the clearance between each seal 92 and aperture 94 gradually increases as the elongated member 82 supporting the seal 92 is slowly withdrawn from its respective port 34 and 40. It may be appreciated that the cooperating tapered seals 92 and tapered apertures 94 thereby provide for regulated variable air flow into and out of the first internal chamber 54.

The underside of each flange 82 defines a bearing surface 96 adapted for alternating engagement with one of a pair of engagement surfaces 98 defined on the upper side of each wing 64 and 66 of the rocker arm 62. Each engagement surface 98 surrounds one of the slots 90 such that upward pivotal movement of one of the wings 64 and 66 causes the engagement surface 98 to contact the bearing surface 96 of a respective pin 76 and 78. As shown in FIG. 9, a delay gap 100 is formed between each engagement surface 98 and bearing surface 96 when the rocker arm 62 is in a neutral position and no input is supplied by the position arm 28. A neutral position is defined when the intake and exhaust ports 34 and 40 are both in sealing engagement with the intake and exhaust pins 76 and 78. As mentioned above, springs 80 exert force against the flange 82 and therefore tend to push pins 76 and 78 into sealing engagement with the ports 34 and 40.

As the rocker arm 62 rotates with shaft 70 in response to input from the position arm 28, one of the engagement surfaces 98 will pivot through a predetermined angle α as defined by the delay gap 100 until the engagement surface 98 and bearing surface 96 are in contact. In the preferred embodiment the predetermined angle α is equal to approximately 2° (FIG. 9), thereby providing for a 2° clockwise or counter-clockwise rotation before the rocker arm 62 engages one of the pins 76 and 78. This 2° clockwise or counter-clockwise rotation defines a dead-band where the rocker arm 62 occupies the neutral position and the intake and exhaust ports 34 and 40 are sealed by the intake and exhaust pins 76 and 78. The delay gap 100 therefore allows for slight oscillating movement of the rocker arm 62 of the type which typically occurs due to irregularities in the road surface over which a vehicle travels, without causing intake or exhaust of air into the leveling valve 48.

Referring now to FIGS. 7, 10 and 11, neutral, intake and exhaust positions of the leveling seal assembly 52 are respectively illustrated. As described above, FIG. 7 illustrates the leveling seal assembly 52 in the neutral position where the rocker arm 62 is not engaging either intake or exhaust pins 76 and 78 such that the tapered seal 92 of each pin 76 and 78 is in sealing engagement with a respective port 34 and 40.

FIG. 10 illustrates the leveling seal assembly 52 in an intake position defined when the intake port 34 is in fluid communication with the supply channel 51. More particularly, the rocker arm 62 is pivoted by the shaft 70 in response to the input provided by the position arm 28 in a first, or clockwise, direction such that the engagement surface 98 of the first wing 64 moves upwardly through the delay gap 100 and contacts the bearing surface 96 of the intake pin 76. Assuming clockwise rotation has a positive value, the input from the position arm 28 is preferably greater than +2° for the rocker arm 62 to occupy the intake position. Continued upward movement of the first wing 64 causes the intake pin 76 to move away from the intake port 34. The elongated member 86 and tapered seal 92 likewise move away from the tapered aperture 94 of the intake port 34 thereby permitting fluid communication between the intake port 34 and the supply channel 51.

FIG. 11 illustrates the leveling seal assembly 52 in an exhaust position defined when the exhaust port 40 is in fluid communication with the supply channel 51 and the intake port 34 is in sealing engagement with the intake pin 76. As the rocker arm 62 pivots in response to the input provided by the position arm 28 in a second, or counter-clockwise, direction opposite the first direction, the second wing 66 of rocker arm 62 moves upwardly through the delay gap 100 until its engagement surface 98 contacts the bearing surface 96 of the exhaust pin 78. Assuming counter-clockwise rotation has a negative value, the input from the position arm 28 is preferably less than −2° for the rocker arm 62 to occupy the exhaust position. As the rocker arm 62 continues to rotate in the second direction, the wing 66 lifts the exhaust pin 78 upwardly away from the exhaust port 40. The elongated member 86 and respective tapered seal 92 thereby move away from the tapered portion 94 of the exhaust port 40 and permit fluid communication between the supply channel 51 and exhaust port 40.

Each engagement surface 96 of the wings 64 and 66 includes an angled portion 102 (FIG. 9) for contacting a respective pin 76 and 78 as the rocker arm 62 pivots to a full intake position, as illustrated in FIG. 10, or a full exhaust position, as illustrated in FIG. 11. It should also be noted that the underside of each wing 64 and 66 of the rocker arm 62 includes an angled stop surface 104 which defines the full intake and full exhaust positions of the leveling seal assembly 52. As the rocker arm 62 pivots through a predetermined angle β in either a clockwise or counter-clockwise direction, one of the stop surfaces 104 (FIG. 9) will contact an inner surface 106 of the first chamber 54 thereby preventing continued rotation of the rocker arm 62 and damage to the leveling valve assembly 52.

Referring now to FIGS. 6 and 12–15, the dump valve 50 is defined by a dump seal assembly 110 received within a second internal chamber 112. The second internal chamber 112 is cylindrical in nature and includes first and second ends defining first and second pilot ports 114 and 116 respectively. Each port 114 and 116 is adapted to be in fluid communication with air tank 30. Internal threads 118 on the first pilot port 114 and internal threads 120 on the second pilot port 116 facilitate the connection of a pilot supply line 122 for supplying air from the air tank 30 to one of the pilot ports 114 and 116 (FIG. 1).

Figure 5:
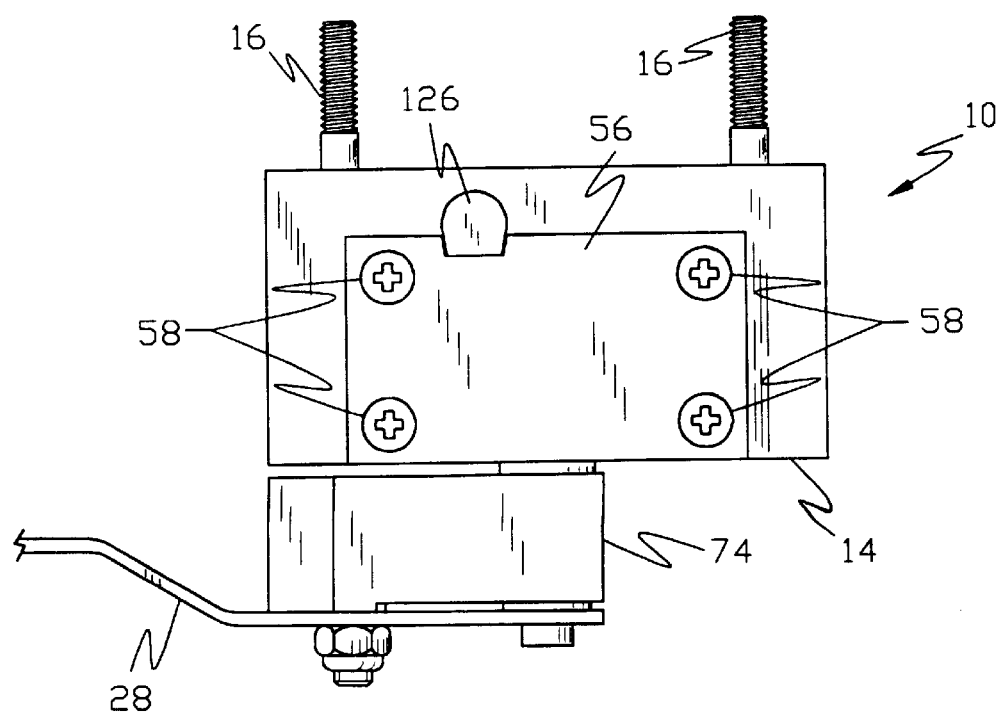
FIG. 5 is a top plan view of the height control valve of FIG. 2.

The supply channel 51 provides fluid communication between the first internal chamber 54 and the second internal chamber 112. Both the fluid spring port 38 and a dump port 124 are in fluid communication with the second internal chamber 112. The dump port 124 is provided for dumping air from the air spring 20 through the fluid spring port 38 and then directly to atmosphere via the second internal chamber 112. A resilient flap 126 has one edge secured to the cover plate 56 and covers the dump port 124 to prevent debris from entering the second internal chamber 112 (FIG. 5). Since the flap 126 is resilient and secured to the cover plate 56 by a single edge, the flap 126 does not hinder the exhausting of air to atmosphere.

Figure 12:
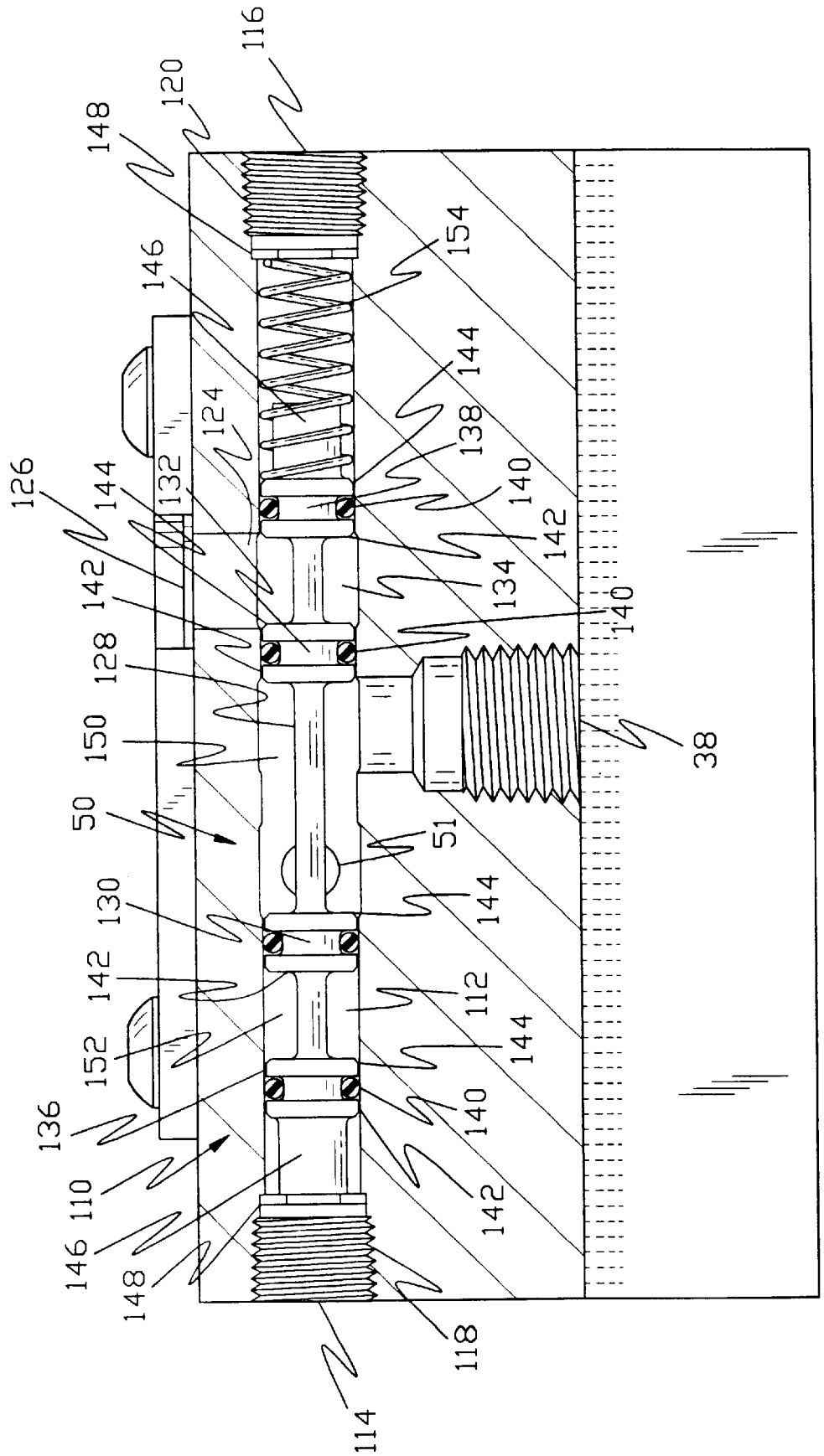
FIG. 12 is a cross sectional view of the height control valve taken along line 12—12 of FIG. 3, illustrating the dump seal assembly in a normal operating position.
Figure 13:
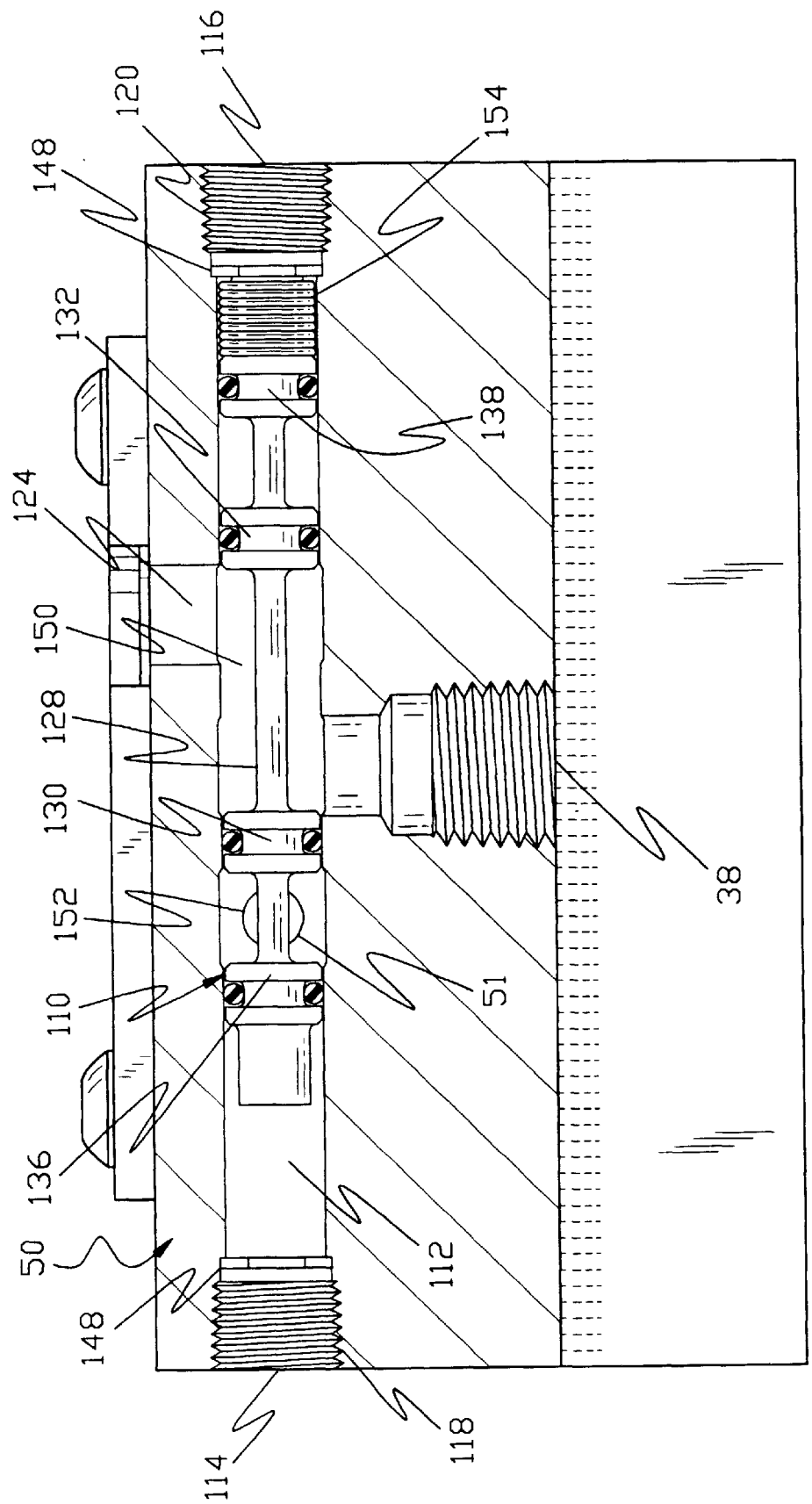
FIG. 13 is a cross sectional view of the height control valve taken along line 12—12 of FIG. 3, illustrating the dump seal assembly in a dump position.
Figure 14:
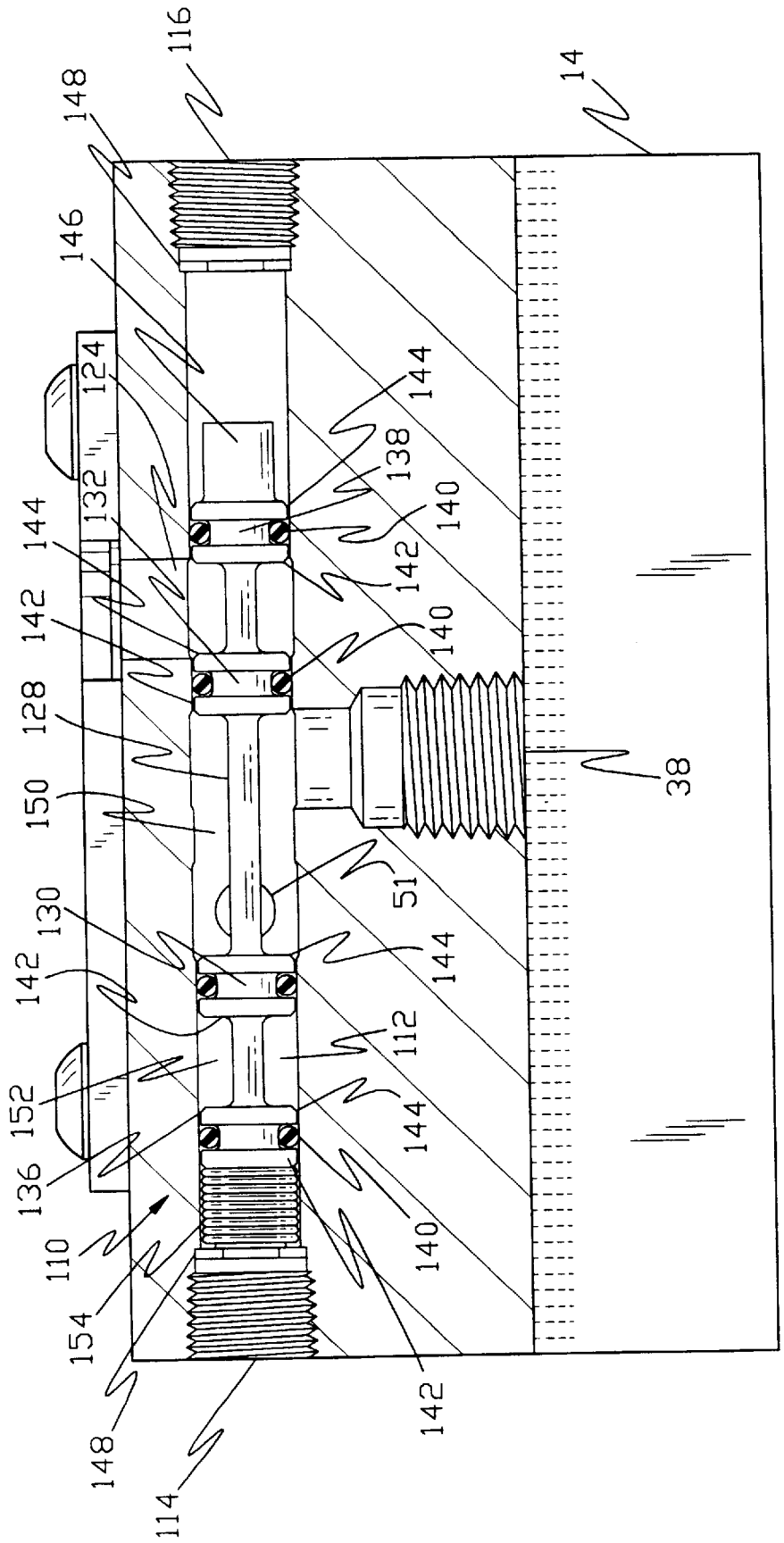
FIG. 14 is a cross sectional view of an alternative embodiment of the dump seal assembly of the present invention, illustrating the dump seal assembly in a normal operating position.

The dump seal assembly 110 controls fluid flow through the second internal chamber 112 wherein an actuator is provided for moving the dump seal assembly 110 between a normal operating position and a dump position. FIGS. 12 and 14 illustrate alternate embodiments of the dump valve 50 with the dump seal assembly 110 in a normal operating position wherein the fluid spring port 38 is in fluid communication with the first internal chamber 64 through the supply channel 51. FIGS. 13 and 15 illustrate alternative embodiments of the dump valve 50 with the dump seal assembly 110 in a dump position which is defined when the fluid spring port 38 is in communication with the dump port 124. As described in greater detail below, activation of the actuator causes the seal assembly 110 to move between the dump and normal operating positions.

With further reference to FIG. 12, the dump seal assembly includes a spool 128 slidably received within the second internal chamber 112. The spool 128 supports first and second sealing discs 130 and 132 for sealingly engaging an inner surface 134 of the second internal chamber 112. First and second end discs 136 and 138 are similarly supported on the spool 128 for sealing engaging the inner surface 134 of the second internal chamber 112. Each disc 130, 132, 136 and 138 comprises a resilient member, preferably an O-ring 140, secured between first and second annular flanges 142 and 144 integrally formed with the spool 128. Each end of the spool 128 includes a stop member 146 adapted for engaging an annular plug 148 separating each of the first and second pilot ports 114 and 116 from the center of the second internal chamber 112. A first fluid passage 150 is defined between the first and second sealing discs 130 and 132. The first fluid passage 150 provides fluid communication between the fluid spring port 38 and the supply channel 51 when the spool 128 is in the normal operating position and provides fluid communication between the fluid spring port 38 and the dump port 124 when the spool 128 is in the dump position. A second fluid passage 152 is defined between the first sealing disc 130 and first end disc 136 for preventing fluid flow through the supply channel 51 when the spool 128 is in the dump position.

The actuator for moving the spool 128 between the dump and normal operating positions comprises a pilot sealing disc defined by one of the first and second end discs 130 and 132. Whichever end disc 130 and 132 is adjacent the pilot port 114 and 116 in fluid communication with the air tank 30 will define the pilot sealing disc such that air pressure may exert a force against the disc 130 or 132. FIGS. 12 and 13 illustrate a positive pilot embodiment of the dump valve 50 of the present invention wherein the first pilot port 114 is in fluid communication with the air tank 30. A biasing means, preferably a spring 154, is received between the second end disc 138 and the annular plug 148 adjacent the second pilot port 116. The spring 154 is guided over the stop member 146 and exerts a force against the second end disc 138 thereby tending to move the spool 128 into a normal operating position wherein the supply channel 51 and first internal chamber 54 are in fluid communication with the fluid spring port 38 (FIG. 12). Positive air pressure applied to the first pilot port 114 opposes the spring 154 thereby causing the spool 128 to move within the second internal chamber in a direction towards the dump position such that the fluid spring port 38 is in communication with the dump port 124 (FIG. 13).

FIGS. 14 and 15 illustrate an alternative embodiment of the dump valve 50 of the present invention having a negative pilot such that a decrease in air pressure applied to the second pilot port 116 causes the spool 128 to move from the normal operating position to a dump position. As with the above embodiment, a spring 154 is located within the second internal chamber 112 for biasing the spool 128 against the applied air pressure. The spring 154 is received between the first end disc 136 and the annular plug 148 separating the first pilot port 114 from the center of the second internal chamber 112. The spring 154 therefore tends to force the spool 128 in a right-hand direction as viewed in FIG. 14 and 15 such that the first fluid passage 150 is aligned to provide communication between the fluid spring port 38 and the dump port 124, thereby defining the dump position. The second pilot port 116 is connected to pilot supply line 122 such that air may be supplied from air tank 30 may exert pressure against the second end disc 13 8 (FIG. 1).

As may be readily appreciated, pressure applied to the second pilot port 116 opposes the spring 154 thereby causing the spool 128 to move within the second internal chamber 112 in a direction towards the normal operating position such that the supply channel 51 and first internal chamber 54 are in fluid communication with the fluid spring port 38. Movement of the spool 128 towards the first pilot port 114 is limited by engagement of the stop member 146 with the annular plug 148 adjacent the first pilot port 114. Upon decreasing the fluid pressure applied to the second pilot port 116, the spring 154 causes the spool valve 128 to move towards the first pilot port 114 until the stop member 146 engages annular plug 148 adjacent the first pilot port 114. At this point, the fluid spring port 38 is in communication with the dump port 124 thereby exhausting the air spring 20.

The operation of the height control valve 10 of the present invention will now be described in greater detail with reference to FIGS. 1, 7, 10–11 and 14–15.

The desired spacing between the vehicle frame 12 and axle support 22 is defined when the position arm 28 provides an input valve equal to zero and the rocker arm 62 is in the neutral position as illustrated in FIG. 7. In this neutral position, both the intake and exhaust pins 76 and 78 both sealingly engage the intake and exhaust ports 34 and 40, respectively. Sealing engagement is assured by the springs 80 biasing each tapered seal 92 of the intake and exhaust pins 76 and 78 into engagement with the tapered portion 94 of the intake and exhaust ports 34 and 40. The delay gap 100 between the engagement surfaces 98 of the rocker arm 62 and the bearing surface 96 of the pins 76 and 78 ensure that no force is exerted by the rocker arm 62 to oppose the force of the spring 80 (FIG. 9). Slight pivoting movement of the rocker arm 62 in response to input from the position arm 28 is accommodated by the delay gap 100 such that sealing engagement between the intake and exhaust pins 76 and 78 and the intake and exhaust ports 34 and 40 remains consistent. As described above, in the preferred embodiment the intake and exhaust ports 34 and 40 remain sealed when input from the position arm 28 pivots the rocker arm 62 within a range of −2° to +2° from the zero input position.

Turning now to FIG. 10, if the vehicle frame 12 moves downwardly relative to the axle support 22, thereby reducing the spacing therebetween, the linkage 26 will cause the position arm 28 to move in an upward direction. This upward movement of the position arm 28 provides an input to rotatable shaft 70, thereby causing pivoting movement of the rocker arm 62. More particularly, the rocker arm 62 will pivot in the first, or clockwise, direction such that the first wing 64 pivots upwardly into contact with the intake pin 76. As the first wing 64 upwardly pivots, the engagement surface 98 contacts the bearing surface 96 and opposes the force of the spring 80 (FIG. 9). The intake pin 76 is thereby lifted away from the intake port 34 such that the tapered seal 92 disengages from the tapered portion 94 of the intake port 34. Gradual pivoting movement of the first wing 64 provides for regulated variable air flow through the intake port 34 due to the cooperating tapered seal 92 and tapered portion 94 of the intake port 34.

Once the tapered seal 92 disengages from the intake port 34, fluid communication is provided between the air tank 30 and the first internal chamber 54. The air then travels from the first internal chamber 54 through the supply channel 51 to the second internal chamber 112.

With further reference to the FIG. 14 embodiment of the present invention, if a positive air pressure is applied to the second pilot port 116 then the spool 128 is in the normal operating position. Air within the first fluid chamber 54 is therefore free to pass through the supply channel 51 and first fluid passage 150 to the air spring 20 through the fluid spring port 38 and delivery line 36 (FIG. 1). The admission of air to the air spring 20 causes the frame 12 to move upwardly relative to the axle support 22 such that the linkage 26 causes the position arm 28 to move downwardly which, in turn, causes the rotatable shaft 70 to provide an input to the rocker arm 62. More particularly, the rotatable shaft 70 causes the rocker arm 62 to pivot in a second, or counter-clockwise, direction opposite the first direction until the rocker arm 62 once again returns to the neutral position as illustrated in FIG. 7 at which time both the intake and exhaust ports 34 and 40 are sealed by the intake and exhaust pins 76 and 78.

Turning now to FIG. 11, if the vehicle frame 12 moves upwardly relative to the axle support 22, thereby increasing the spacing therebetween, then the linkage 26 causes the position arm 28 to move downwardly. The downward movement of the position arm 28 provides an input to the rocker arm 62, more particularly, pivoting movement in the second, or counter-clockwise, direction such that the second wing 66 moves away from the exhaust 40. Continued movement of the rocker arm 62 in the second direction causes the engagement surface 98 of the second wing 66 to contact the bearing surface 96 of the exhaust pin 78 thereby forcing the exhaust pin 78 away from the exhaust port 40 (FIG. 9). The tapered seal 92 of exhaust pin 78 thereby disengages from the tapered portion 94 of the exhaust port 40 allowing fluid communication between the internal chamber 54 and the exhaust port 40. With further reference to FIG. 14 illustrating the spool 128 in the normal operating position, the air from within the air spring 20 then exhausts through the supply line 36, fluid spring port 38, first fluid passage 150, and supply channel 51 into the first internal chamber 54. The air subsequently passes through the exhaust port 40 to atmosphere.

If the operator wishes for the leveling valve 48 to control operation of the air spring 20 in combination with using the negative pilot embodiment of the dump valve 50 as illustrated in FIGS. 14 and 15, then air pressure is supplied to the second pilot port 116 to maintain the spool valve 128 in a normal operating position such that the first fluid passage 150 provides communication between the first internal chamber 54 and the fluid spring port 38. By reducing the pressure applied to the second pilot port 116, the spring 154 moves the spool 128 towards the dump position such that the fluid spring port 38 is in direct communication with the dump port 124 for quickly exhausting the air from within the air spring 20 (FIG. 15). As mentioned above, this is a tremendous advantage over the prior art dump valve assemblies in that a reduction in pressure may be utilized to signal the rapid exhausting of air from the air spring 20. Since most trailers, as well as many other vehicles, fail to have an independent source of pressurized fluid, positive pressure may not readily be utilized with these vehicles to signal the dumping of air from the air spring 20.

Referring now to the positive pilot embodiment of the dump valve 50 of the present invention as illustrated in FIGS. 12 and 13, should the operator wish to dump the air out of the air spring 20, air pressure is applied to the first pilot port 114. The positive pressure opposes the spring 154 thereby causing the spool 128 to move from the normal operating position (FIG. 12) to the dump position (FIG. 13) wherein the fluid spring port 3 8 is in direct communication with the dump port 124. This provides for rapid exhausting of the air contained within the air spring 20 through the supply line 36, fluid spring port 38, first fluid passage 150 and dump port 124.

From the above description, it should be apparent that the present invention provides a height control valve including an integral dump valve providing an efficient and direct flow path communicating with an air spring for facilitating the rapid supply and exhaust of fluid to and from the air spring. Furthermore, the present invention provides for such a dump valve which may be activated by a decrease in fluid pressure applied to a negative pilot port, thereby providing for increased flexibility in the application of the height control valve.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A height control valve for controlling a fluid spring, said height control valve comprising:

a valve body defining first and second internal chambers;

an intake port adapted to provide fluid communication between a fluid source and said first internal chamber;

an exhaust port adapted to provide fluid communication between the atmosphere and said first internal chamber;

a supply channel providing fluid communication between said first and second internal chambers;

a dump port adapted to provide fluid communication between the atmosphere and said second internal chamber;

a fluid spring port adapted to provide fluid communication between a fluid spring and said second internal chamber;

an operating member supported on said valve body and movable relative to said valve body to provide an input;

a leveling seal assembly for controlling fluid flow through said first internal chamber, said leveling seal assembly received within said first internal chamber and responsive to said input of said operating member for movement between a neutral position, an intake position and an exhaust position;

wherein said neutral position is defined when said leveling seal assembly prevents fluid flow between said supply channel and both said intake and exhaust ports, said intake position is defined when said leveling seal assembly places said supply channel in fluid communication with said intake port in response to said operating member providing an input greater than a predetermined value, and said exhaust position is defined when said leveling seal assembly places said supply channel into fluid communication with said exhaust port in response to said operating member providing an input less than a predetermined value;

a dump seal assembly for controlling fluid flow through said second internal chamber, said dump seal assembly received within said second internal chamber and selectively movable between a normal operating position and a dump position; and wherein said normal operating position is defined when said dump seal assembly places said fluid spring port in fluid communication with said first internal chamber and said dump position is defined when said dump seal assembly places said fluid spring port in fluid communication with said dump port.

2. The height control valve according to claim 1 wherein said leveling seal assembly comprises a rocker arm pivotally mounted within said first internal chamber for movement between said neutral position in which both said intake and exhaust ports are sealed, said intake position in which said intake port is in communication with said supply port and said exhaust port is sealed, and said exhaust position in which said exhaust port is in communication with said supply port and said intake port is sealed.

3. The height control valve according to claim 2 wherein said leveling seal assembly further comprises an intake pin engagable with said intake port, and an exhaust pin engagable with said exhaust port, wherein said intake and exhaust pins are alternatively engagable with said rocker arm as said rocker arm pivots.

4. The height control valve according to claim 1 wherein said dump seal assembly comprises a sealing member sealingly engaging said second internal chamber and an actuator for moving said sealing member between said normal operating position and said dump position.

5. The height control valve according to claim 4 wherein activation of said actuator causes said sealing member to move from said dump position towards said normal operating position.

6. The height control valve according to claim 4 wherein said sealing member comprises:

a spool slidably received within said second internal chamber, said spool including first and second sealing discs sealingly engaging said second internal chamber; and a fluid passage defined between said first and second sealing discs, said fluid passage providing fluid communication between said fluid spring port and said supply channel when said spool is in said normal operating position and providing fluid communication between said fluid spring port and said dump port when said spool is in said dump position.

7. The height control valve according to claim 6 further comprising a pilot port adapted to provide fluid communication between an external fluid source and said second internal chamber, wherein said actuator comprises a pilot sealing disc supported on said spool and sealingly engaging said second internal chamber whereby the selective administration of fluid pressure to said pilot port causes movement of said spool between said normal operating position and said dump position.

8. The height control valve according to claim 7 further comprising a biasing means for biasing said spool towards said pilot port.

9. The height control valve according to claim 8 wherein said biasing means forces said spool towards said dump position such that positive fluid pressure applied to said pilot port opposes said biasing means and causes said spool to move within said second internal chamber towards said normal operating position.

10. A height control valve for controlling a fluid spring, said height control valve comprising:

a valve body defining an internal chamber;

an intake port adapted to provide fluid communication between a fluid source and said internal chamber;

an exhaust port adapted to provide fluid communication between the atmosphere and said internal chamber;

a supply channel adapted to provide fluid communication between a fluid spring and said internal chamber;

an operating member supported on said valve body and movable relative to said valve body to provide an input;

a rocker arm for controlling fluid flow within said internal chamber and including a pair of engagement surfaces, said rocker arm pivotally movable within said internal chamber in response to said input of said operating member;

an intake pin including a bearing surface, said intake pin biased for engagement with said intake port;

an exhaust pin including a bearing surface, said exhaust pin biased for engagement with said exhaust port;

wherein said bearing surfaces of said intake and exhaust pins are alternatively engagable with one of said engagement surfaces of said rocker arm in response to pivotal movement of said rocker arm; and said rocker arm is pivotally movable between an intake position in which said intake port is in communication with said supply channel and said exhaust port is in sealing engagement with said exhaust pin, an exhaust position in which said exhaust port is in communication with said supply channel and said intake port is in sealing engagement with said intake pin, and a neutral position in which said intake and exhaust ports are in sealing engagement with said intake and exhaust pins, respectively.

11. The height control valve according to claim 10 wherein during said neutral position said rocker arm is disengaged from both said intake and exhaust pins which are in sealing engagement with said intake and exhaust ports, respectively.

12. The height control valve according to claim 11 wherein during said intake position said rocker arm engages said intake pin thereby forcing said intake pin away from said intake port while said exhaust pin is disengaged from said rocker arm and is in sealing engagement with said exhaust port.

13. The height control valve according to claim 11 wherein during said exhaust position said rocker arm engages said exhaust pin thereby forcing said exhaust pin away from said exhaust port while said intake pin is disengaged from said rocker arm and is in sealing engagement with said intake port.

14. The height control valve according to claim 10 wherein said intake and exhaust ports each define a tapered aperture opening towards said internal chamber, and said intake and exhaust pins include tapered seals for cooperating in sealing engagement with said tapered apertures of said intake and exhaust ports thereby providing for regulated fluid flow through said intake and exhaust ports.

15. The height control valve according to claim 10 wherein said rocker arm further comprises a stop surface for engaging said valve body thereby preventing damaging overtravel of said rocker arm.

16. The height control valve according to claim 10 further comprising a dead band for minimizing fluctuation in the sealing engagement of said intake and exhaust pins with said intake and exhaust ports, respectively, upon pivotal movement of said rocker arm.

17. The height control valve according to claim 16 wherein said dead band comprises a gap of predetermined thickness between each said bearing surface of said intake and exhaust pins and each said respective engagement surface of said rocker arm when said rocker arm is in said neutral position.

18. A dump valve for selectively placing a leveling valve in fluid communication with a fluid spring, said dump valve comprising:

a valve body defining an internal chamber;

a supply channel adapted to provide fluid communication between the leveling valve and said internal chamber;

a dump port adapted to provide fluid communication between the atmosphere and said internal chamber;

a fluid spring port adapted to provide fluid communication between the fluid spring and said internal chamber;

a seal assembly for controlling fluid flow through said internal chamber and sealingly engaging said internal chamber;

wherein said seal assembly comprises a spool slidably received within said internal chamber, said spool including first and second sealing discs sealingly engaging said internal chamber, and a first fluid passage defined between said first and second sealing discs;

an actuator for moving said spool between a normal operating position and a dump position; and wherein said first fluid passage provides fluid communication between said fluid spring port and said supply channel when said spool is in said normal operating position and provides fluid communication between said fluid spring port and said dump port when said spool is in said dump position.

19. The dump valve according to claim 18 wherein activation of said actuator causes said seal assembly to move between said dump position and said normal operating position.

20. The dump valve according to claim 18 wherein said spool further comprises:

first and second end discs supported on said spool and sealingly engaging said internal chamber; and a second fluid passage defined between said second sealing disc and said second end disc for preventing fluid flow through said supply channel when said spool is in said dump position.

21. The dump valve according to claim 20 further comprising a pilot port adapted to provide fluid communication between an external fluid source and said internal chamber, wherein said actuator comprises a pilot sealing disc defined by one of said first and second end discs whereby the selective administration of fluid pressure to said pilot port causes movement of said spool between said normal operating position and said dump position.

22. The dump valve according to claim 21 further comprising a biasing means for biasing said spool towards said pilot port.

23. The dump valve according to claim 22 wherein said biasing means forces said spool towards said dump position such that positive fluid pressure applied to said pilot port opposes said biasing means and causes said spool to move within said second internal chamber in a direction towards said normal operating position.

24. The dump valve according to claim 22 wherein said biasing means forces said spool towards said normal operating position such that positive fluid pressure applied to said pilot port opposes said biasing means and causes said spool to move within said second internal chamber in a direction towards said dump position.

* * * * *